(12) United States Patent
Choi et al.

(10) Patent No.: US 10,833,465 B2
(45) Date of Patent: Nov. 10, 2020

(54) MOBILE DEVICE WITH EDGE ACTIVATION

(71) Applicant: SYMBOL TECHNOLOGIES, LLC, Lincolnshire, IL (US)

(72) Inventors: JaeHo Choi, Whitestone, NY (US); Travis Baldwin, Medford, NY (US); Mu-Kai Shen, Taipei (TW); Richard Martin, New Hyde Park, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 16/343,614

(22) PCT Filed: Nov. 15, 2016

(86) PCT No.: PCT/US2016/062002
§ 371 (c)(1),
(2) Date: Apr. 19, 2019

(87) PCT Pub. No.: WO2018/075084
PCT Pub. Date: Apr. 26, 2018

(65) Prior Publication Data
US 2020/0050272 A1 Feb. 13, 2020

Related U.S. Application Data

(60) Provisional application No. 62/410,735, filed on Oct. 20, 2016.

(51) Int. Cl.
*G06F 3/01* (2006.01)
*H01R 31/06* (2006.01)
(Continued)

(52) U.S. Cl.
CPC ........... *H01R 31/06* (2013.01); *G06F 1/1632* (2013.01); *G06F 1/1656* (2013.01); *G06F 3/016* (2013.01);
(Continued)

(58) Field of Classification Search
CPC .... H01R 31/06; H01R 13/66; H01R 13/5219; H01R 13/22; H01R 2201/16; H01R 24/60;
(Continued)

(56) References Cited

U.S. PATENT DOCUMENTS 4,248,494 A 2/1981 McDonald et al.
4,740,172 A 4/1988 Tubbs
(Continued)

FOREIGN PATENT DOCUMENTS

| EP | 1455529 A1 | 9/2004 |
|----|------------|--------|
| EP | 2141566 A2 | 1/2010 |
| EP | 2385592 A1 | 11/2011 |

OTHER PUBLICATIONS

International Search Report and Written Opinion for International Application No. PCT/US2017/020121 dated Jul. 11, 2017.
(Continued)

*Primary Examiner* — Rodney Amadiz

(57) ABSTRACT

A mobile device with edge activation is provided. The mobile device comprises: a housing; a data capture component; an actuator disposed on a side of the housing and configured to activate the data capture component when actuated; a display, disposed within the housing; a touch screen disposed on the display; a tactile indicator at the housing between the actuator and the touch screen; and, an activation area of the touch screen, adjacent the tactile indicator, the activation area configured to initiate a digital location for activating the data capture component when touch input is received at the activation area.

14 Claims, 14 Drawing Sheets

(51) Int. Cl.

| | |
|---|---|
| *H01R 13/52* | (2006.01) |
| *G06F 1/16* | (2006.01) |
| *G06F 3/0488* | (2013.01) |
| *H01R 13/66* | (2006.01) |
| *H01R 13/22* | (2006.01) |
| *H01R 24/60* | (2011.01) |
| *H04M 1/725* | (2006.01) |
| *H04M 1/04* | (2006.01) |

(52) U.S. Cl.
CPC ........... *G06F 3/0488* (2013.01); *H01R 13/22* (2013.01); *H01R 13/5219* (2013.01); *H01R 13/66* (2013.01); *G06F 2203/014* (2013.01); *H01R 24/60* (2013.01); *H01R 2201/16* (2013.01); *H04M 1/04* (2013.01); *H04M 1/72527* (2013.01)

(58) Field of Classification Search
CPC ...... G06F 3/0488; G06F 3/016; G06F 1/1656; G06F 1/1632; G06F 2203/014; H04M 1/04; H04M 1/72527
See application file for complete search history.

(56) References Cited

U.S. PATENT DOCUMENTS

| | | | |
|---|---|---|---|
| 4,861,283 A | 8/1989 | Beaulieu et al. | |
| 5,354,204 A | 10/1994 | Hughes | |
| 5,456,620 A | 10/1995 | Kaminski | |
| 5,766,020 A | 6/1998 | Hughes | |
| 5,800,218 A | 9/1998 | Abucewicz | |
| 5,857,866 A | 1/1999 | Felps | |
| 6,390,824 B1 | 5/2002 | Vance | |
| 6,431,880 B1 | 8/2002 | Davis et al. | |
| 6,616,487 B1 | 9/2003 | Lai | |
| 6,719,590 B1 | 4/2004 | Wu | |
| 6,719,591 B1 | 4/2004 | Chang | |
| 6,824,406 B1 | 11/2004 | Sharples et al. | |
| 6,830,483 B1 | 12/2004 | Wu | |
| 7,094,099 B2 | 8/2006 | Daggett et al. | |
| 7,121,850 B2 | 10/2006 | Yeh | |
| 7,445,513 B1 | 11/2008 | Lee | |
| 7,717,739 B2 | 5/2010 | Hawkins et al. | |
| 7,722,369 B2 | 5/2010 | Bushby | |
| 7,789,704 B2 | 9/2010 | Ho | |
| 7,874,844 B1 | 1/2011 | Fitts, Jr. | |
| 7,909,651 B2 | 3/2011 | Kim et al. | |
| 7,980,088 B2 | 7/2011 | LeClear et al. | |
| 8,535,102 B1 | 9/2013 | Colahan et al. | |
| 8,618,416 B2 | 12/2013 | Rothbaurer et al. | |
| 8,721,371 B2 | 5/2014 | Picker et al. | |
| 9,312,651 B2 | 4/2016 | Hsiang | |
| 9,356,370 B2 | 5/2016 | Lee et al. | |
| 9,455,528 B1 | 9/2016 | Chao | |
| 9,529,387 B2 | 12/2016 | Carnevali | |
| 9,557,716 B1 | 1/2017 | Inamdar | |
| 9,602,639 B2 | 3/2017 | Carnevali | |
| 9,706,026 B2 | 7/2017 | Carnevali | |
| 9,916,073 B1* | 3/2018 | Szeto | G06F 3/0414 |
| 2007/0167197 A1 | 7/2007 | Fuke et al. | |
| 2008/0295015 A1* | 11/2008 | Liu | G06F 3/04895 715/772 |
| 2009/0153438 A1 | 6/2009 | Miller et al. | |
| 2009/0295753 A1 | 12/2009 | King et al. | |
| 2009/0323262 A1 | 12/2009 | Arita | |
| 2010/0026656 A1 | 2/2010 | Hotelling et al. | |
| 2010/0029339 A1 | 2/2010 | Kim et al. | |
| 2012/0009896 A1 | 1/2012 | Bandyopadhyay et al. | |
| 2012/0075233 A1 | 3/2012 | Lakshminarayanan et al. | |
| 2012/0233571 A1* | 9/2012 | Wever | G06F 3/048 715/835 |
| 2014/0181746 A1* | 6/2014 | Lo | G06F 3/04886 715/835 |
| 2015/0248213 A1* | 9/2015 | Postal | G06F 3/04817 715/835 |
| 2016/0109999 A1* | 4/2016 | Lee | G06F 3/03547 345/173 |
| 2016/0211609 A1 | 7/2016 | Sorias | |

OTHER PUBLICATIONS

International Search Report and Written Opinion for International Patent Application No. PCT/US2016/062002 dated Jun. 21, 2017.
International Search Report and Written Opinion for International Application No. PCT/US2011/052929 dated Nov. 11, 2011.

* cited by examiner

MOBILE DEVICE WITH EDGE ACTIVATION

CROSS-REFERENCE TO RELATED APPLICATIONS BACKGROUND

The present application claims priority from U.S. Provisional Application No. 62/410,735 filed Oct. 20, 2016, the entire contents of which is incorporated herein by reference.

BACKGROUND

Mobile devices equipped with touch screen displays and data capture devices are often configured to activate the data capture devices using very specific keys. Such configurations are often not compatible with ergonomics of all users. For example, for mobile devices equipped with scanners, the position of an activation key and/or button is fixed and may not be compatible with a grip of all users; similarly, while activation of the scanner may also occur using a button rendered on the touch screen display, it may be difficult for a user to locate such a key unless the user is looking at the touch screen display, which is not always convenient and/or possible. As use of such scanners in warehousing environments, and the like, is often frequent and/or repetitive, lack of an ergonomic positioning of the activation key and/or the trigger areas may lead to repetitive stress injuries.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts described herein, and explain various principles and advantages of those implementations.

Figure 1:
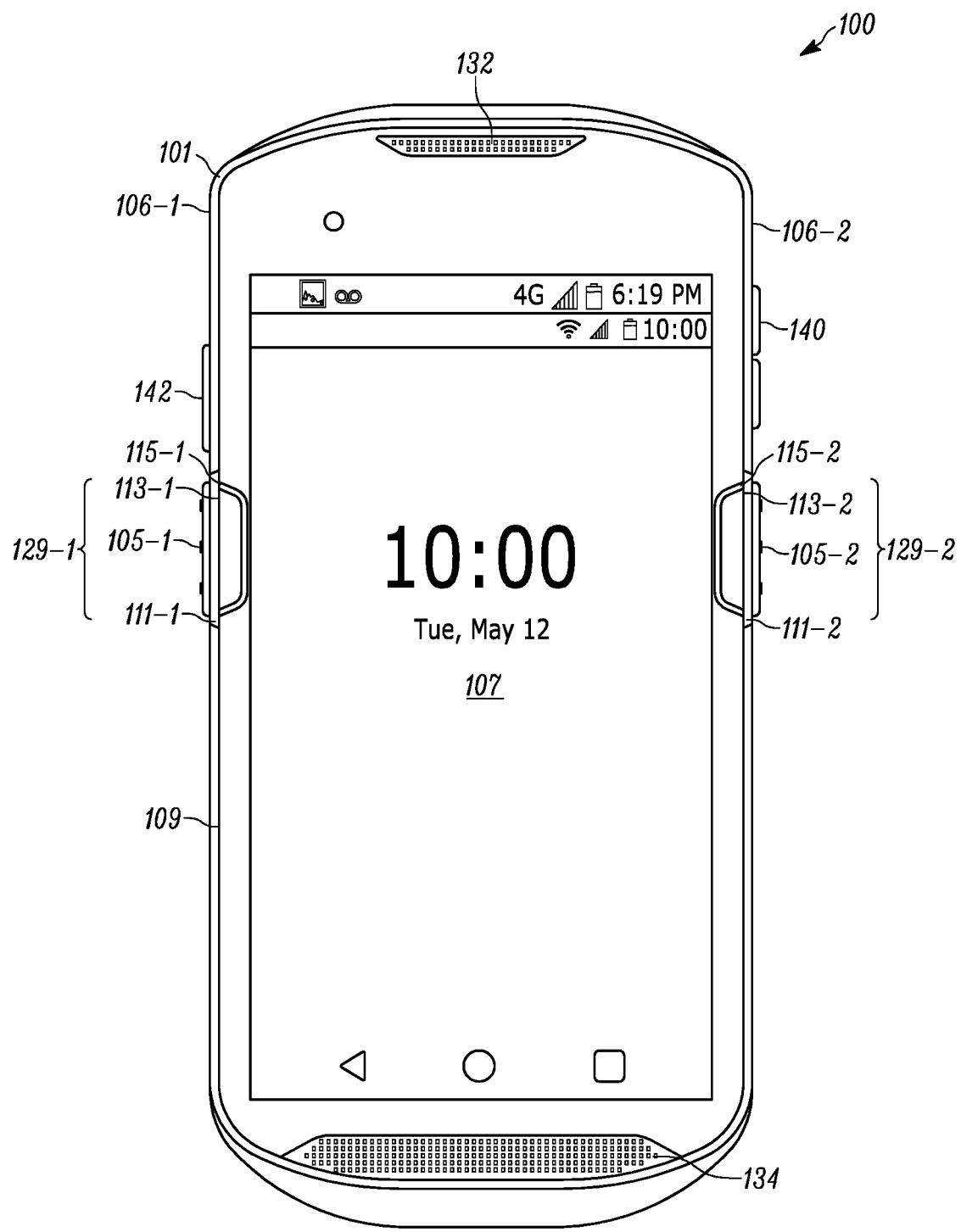
FIG. 1 depicts a front perspective view of a mobile device with edge activation, according to non-limiting implementations.

The apparatus and method components have been represented where appropriate by conventional symbols in the drawings, showing only those specific details that are pertinent to understanding the implementations of the present specification so as not to obscure the disclosure with details that will be readily apparent to those of ordinary skill in the art having the benefit of the description herein.

DETAILED DESCRIPTION

Implementations of the present disclosure describe a mobile device and/or a mobile device having a data capture component and/or a data capture module, such as a camera, a scanner and/or an imager (and/or alternatively a Near Field Communication (NFC) device, and/or a radio frequency identification (RFID) device). Among the described implementations, is a mobile device that includes a data capture activation interface, that includes an activation area configured to be directly activated by a user independent from the user interface of an application that is being executed by the mobile device. The activation area may correspond to a touch sensor and/or capacitive sensor and/or resistive sensor (such as a particular area of a touch screen and/or a touch screen display and/or an active bezel) that is specially programmed to initiate a digital location for activating the data capture component when touch input is received at the activation area; such initiating of the digital location may include activating the data capture capability of the data capture component. The digital location may be rendered at a display of the device as a digital button and/or may be located at the activation area. The digital button may be moved on the display which may provide a more ergonomic position for a user to activate the data capture component repeatedly, which may reduce repetitive stress for the user.

The data capture activation interface may include both tactile and visual indicators of its location.

In particular, the data capture activation interface may include a tactile indicator, such as a notch along the edge of the housing of the mobile device and/or one or more bumps along the edge of the housing, which allows the activation area to be located using touch, without looking at the mobile device.

The data capture activation interface may include a visual indicator of its location, such as an area permanently visually indicated (e.g., drawn or etched) at the edge of the display, for example around the activation area. In an alternate implementation, the visual indicator area is not permanent and may be displayed on the mobile device's display when the mobile device is powered up.

The data capture activation interface may additionally include a button and/or an actuator disposed at the side of the housing of the mobile device, which is also used for activating the data capture capability. The tactile indicator is disposed in the housing adjacent the actuator and adjacent the activation area; when present the visual indicator may also be disposed adjacent the actuator.

In one implementation, one or more of the tactile indicator, the visual indicator, and the actuator may be backlit to further visually indicate the location of the data capture activation interface. In another implementation, the backlighting may be activated upon user activation of the data capture functionality (e.g., upon initiation of a data capture, an image capture, a barcode scan, an NFC read, an RFID read and the like). Alternatively, or in addition, the backlighting may change to indicate whether the data capture was successful. In yet another implementation, the backlighting color and/or lighting pattern may indicate a particular mode selected for the data capture interface (e.g., a data capture activation mode or an alternate mode, such as a mode for activating camera, push-to-talk, text message and/or other functionality).

In some implementations, the data capture activation interface may be duplicated at both sides of the mobile device so as to allow activation via a thumb and/or an index finger of a hand gripping the mobile device, for example. While both data capture activation interfaces may be disposed on opposing sides of the mobile device at similar distances from a top and/or bottom of the mobile device, further implementations may include a staggered arrangement along the opposing sides of the mobile device in order to take into account the tendency of thumb and index fingers of one hand to grip the opposing edges of the mobile device at different locations.

Several modes may be used to activate the data capture component. For example, the actuator (and/or button) may be used to activate the data capture component. Alternatively, when touch input is received at the activation area of the touch screen, the data capture component may be activated: in other words, the activation area may comprise a digital location for activating the data capture component. Alternatively, when touch input is received at the activation area of the touch screen, a digital button (which may also be referred to as a minimized data capture interface) may be rendered at the display in proximity to the activation area (e.g. at an edge of the display adjacent the activation area); the digital button comprises the digital location for activating the data capture component. In yet further implementations, the digital button may be rendered when the actuator is actuated. Hence, the data capture component may be activated using the actuator and/or the activation area and/or the digital button, all of which are at least tactilely locatable using the tactile indicator. When the data capture component is activated, the mobile device performs a data capture therewith (e.g. image capture, barcode scanning, RFID tag read, NFC tag read and the like).

In the event that continuous and/or frequent data captures are to occur (e.g. capture of multiple barcodes and/or multiple RFID reads and/or multiple NFC reads, e.g. in a warehousing environment), a more prominent data capture activation interface may be more convenient and/or more ergonomically located at the mobile device. In this case, a slide gesture may be used to slide the digital button (e.g. a minimized data capture activation area) toward an opposing side of the display to expand it thereto, for example from side-to-side across the display. The slide gesture results in an expanded data capture activation area and/or an expanded digital button, where at least part of the display screen remains visible.

However, to provide better and/or more ergonomic access to data capture, the expanded digital button (and/or the expanded data capture activation area) may be further expanded by sliding an edge of the expanded digital button towards a bottom and/or a top of the display, which results in a maximized digital button (and/or a maximized data capture activation area). In an implementation, the maximized digital button may occupy the entire display by sliding its edges to all corresponding sides of the display. Alternatively, one or more edges of the maximized digital button may be slid partially to a corresponding edge in order to preserve visibility of icons or other elements presented at the remaining part of the display. Receipt of touch input (e.g. tapping and the like) at the maximized digital button, regardless of its size, may cause the mobile device to perform the data capture.

The mobile device may overlay the digital button (and/or data capture activation area), at the display, regardless of size, on top of any background, icons, and/or currently executed applications which may permit direct access to activating the data capture functionality. In one implementation, the digital button (and/or data capture activation area) may be at least partially transparent such that icons and/or other rendered items at the display are at least partially visible through the digital button (and/or data capture activation area).

The present specification provides a mobile device comprising: a housing; a data capture component; an actuator disposed on a side of the housing and configured to activate the data capture component when actuated; a display, disposed within the housing; a touch screen disposed on the display; a tactile indicator at the housing between the actuator and the touch screen; and, an activation area of the touch screen, adjacent the tactile indicator, the activation area configured to initiate a digital location for activating the data capture component when touch input is received at the activation area.

The mobile device may further comprise a visual indicator at the touch screen, the visual indicator indicating a location of the activation area and the actuator.

The display may be configured to render a visual indicator of a location of the activation area and the actuator.

The mobile device may further comprise a light configured to illuminate the activation area when one or more of: the touch input is received at the activation area; and respective touch input is received at the actuator.

The tactile indicator may comprise a notch at the housing adjacent the actuator.

The tactile indicator may comprise one or more bumps at the housing adjacent the actuator.

The data capture component may comprise one or more of a data scanner and a camera.

The touch screen may extend beyond the display to the side of the housing adjacent the actuator, the activation area located between the tactile indicator and the display.

The digital location for activating the data capture component may comprise the activation area of the touch screen, such that the data capture component is activated when the touch input is received at the activation area.

The digital location for activating the data capture component may comprise a digital button rendered at the display adjacent the activation area of the touch screen, the digital button indicating a corresponding area of the touch screen configured to receive further touch input for activating the data capture component. The digital button may be further configured to be one or more of moved and extended on the display, along with the corresponding area of the touch screen, when given input is received at the touch screen.

The mobile device may further comprise a further electronic component, the activation area configured to receive given touch input configured to change a mode of both the actuator and the digital location from actuating the data capture component to actuating the further electronic component when given touch input is received at the activation area. The mobile device may further comprise a light configured to illuminate the activation area, according to the given touch input, to indicate the mode. The light may be further configured to one or more of change color and change a lighting pattern according to the given touch input, to indicate the mode. The further electronic component may comprise one or more of a camera device, a push-to-talk device, a telephone device and a messaging device.

The mobile device may further comprise a second actuator disposed on a second side of the housing, a second tactile indicator at the housing between the second actuator and the touch screen; and, a second activation area of the touch screen, each of the second actuator, the second tactile indicator and the second activation area respectively similar to the actuator, the tactile indicator and the activation area.

Figure 2:
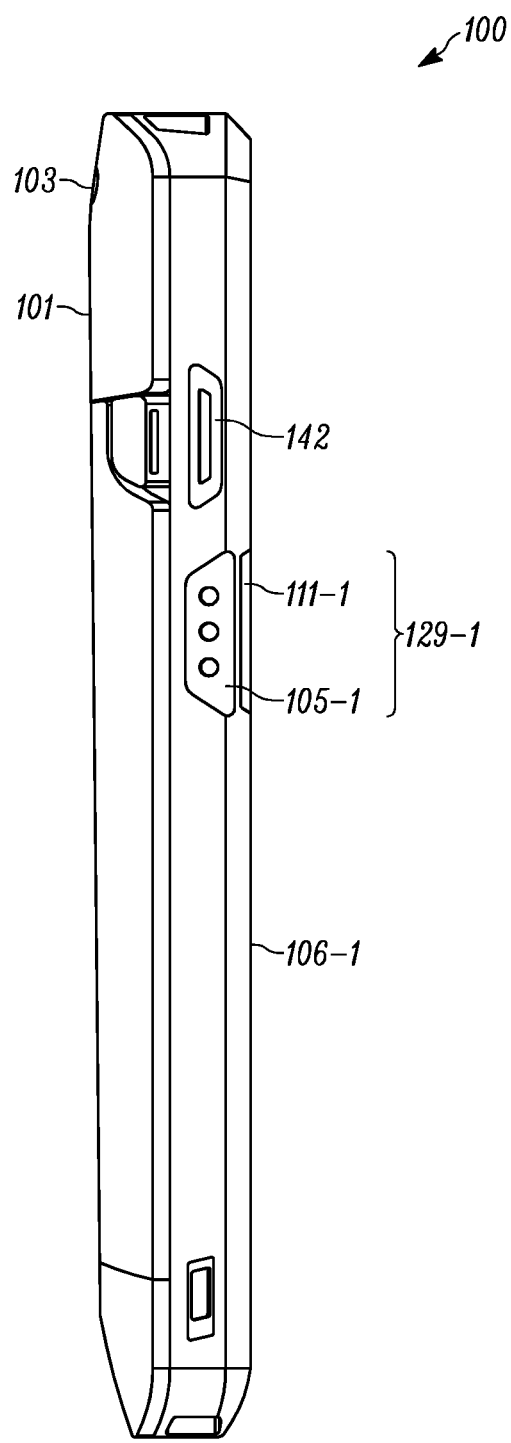
FIG. 2 depicts a left side perspective view of the mobile device of FIG. 1, according to non-limiting implementations.
Figure 3:
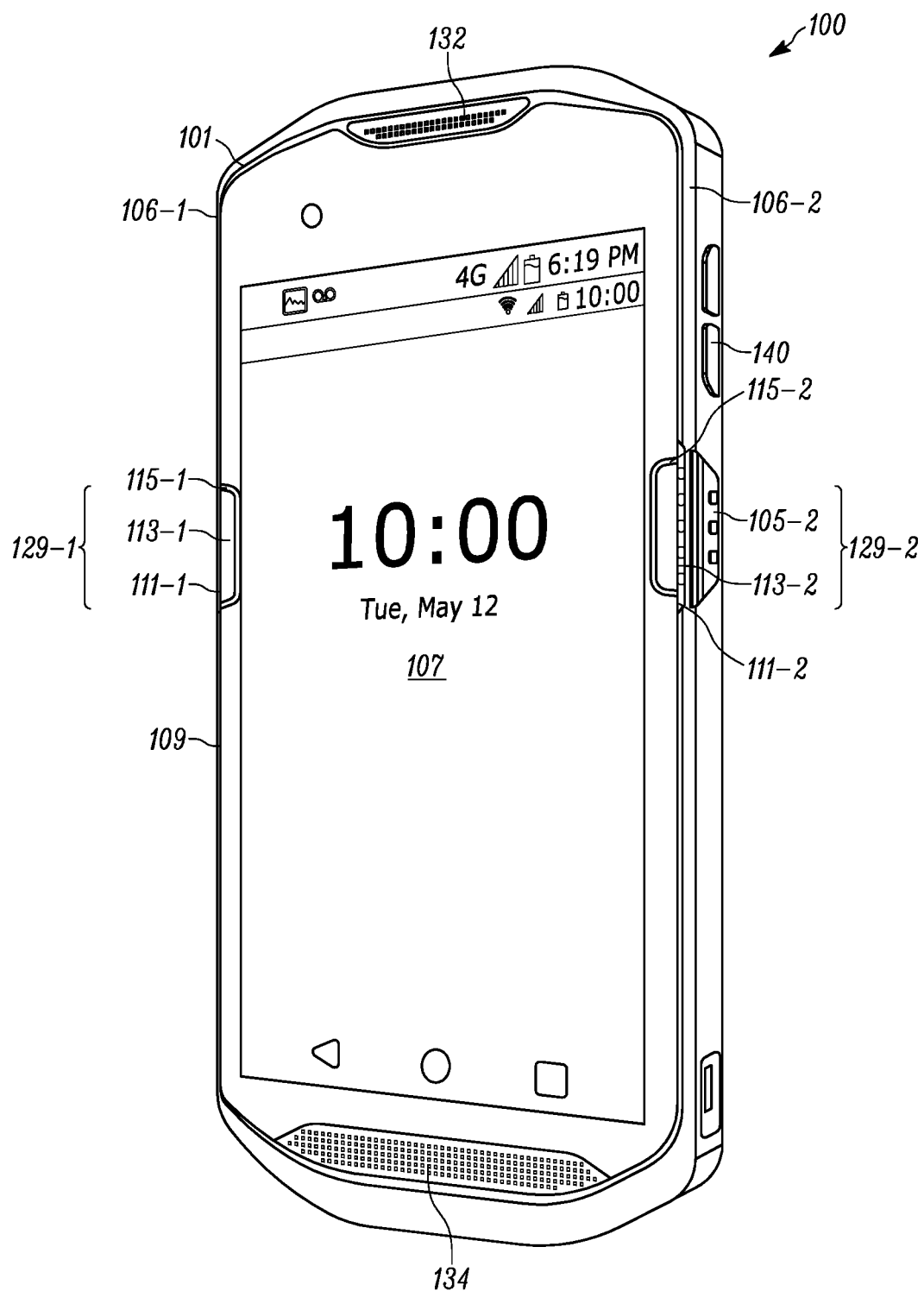
FIG. 3 depicts a right three-quarter perspective view of the mobile device of FIG. 1, according to non-limiting implementations.

Attention is directed to FIG. 1, FIG. 2, FIG. 3 and FIG. 4 which respectively depict: a front perspective view of a mobile device 100 with edge activation (interchangeably referred to hereafter as device 100); a left side perspective view of device 100; a right three-quarter perspective view of device 100; and a schematic diagram of device 100. Device 100 comprises: a housing 101; a data capture component 103 (e.g. which may be at least partially disposed on a rear of housing 101 as best seen in FIG. 2); at least one actuator 105-1, 105-2 disposed on a respective side 106-1, 106-2 of housing 101 and configured to activate data capture component 103 when actuated; a display 107, disposed within housing 101; a touch screen 109 disposed on display 107; a tactile indicator 111-1, 111-2 at housing 101 between each actuator 105-1, 105-2 and touch screen 109; and, an activation area 113-1, 113-2 of touch screen 109, adjacent each tactile indicator 111-1, 111-2, each activation area 113-1, 113-2 configured to initiate a digital location for activating data capture component 103 when touch input is received at activation area 113-1, 113-2. In depicted implementations, touch screen 109 extends beyond display 107 to sides 106-1, 106-2 of housing 101 adjacent actuators 105-1, 105-2, and each activation area 113-1, 113-2 is located between a respective tactile indicator 111-1, 111-2 and the display 107.

As described in further detail below, the term "initiate a digital location for activating the data capture component" can include initiating a rendering of a data capture graphic user interface and/or digital button at display 107 and then accepting touch input at the data capture graphic user interface and/or digital button to perform a data capture. However, the term "initiate a digital location for activating the data capture component" can also include causing a portion of the touch display to be configured to accept touch input to and then accepting touch input at the portion of the touch display to perform a data capture.

As depicted, device 100 further comprises visual indicators 115-1, 115-2 at touch screen 109, each visual indicator 115-1, 115-2 indicating a location of a respective activation area 113-1, 113-2 and actuator 105-1, 105-2. For example, as depicted, each visual indicator 115-1, 115-2 comprises a printed and/or inked and/or etched region on a surface of touch screen 109 around each activation area 113-1, 113-2 and adjacent each actuator 105-1, 105-2. Visual indicators 115-1, 115-2 may be optional, however, with a position of each activation area 113-1, 113-2 indicated by a respective tactile indicator 111-1, 111-2 and/or by a respective activation area 113-1, 113-2 being adjacent an actuator 105-1, 105-2.

In yet further implementations, display 107 may be configured to render a visual indicator of a location of an activation area 113 and an associated actuator 105. For example, rather than a visual indicator 115 being permanently printed, and the like, at touch screen 109, and the like, display 107 may be controlled to render a visual indicator of an activation area 113 and an associated actuator 105 adjacent an activation area 113; such a visual indicator may comprise a line, an area, text, one or more icons, and the like rendered at display 107 adjacent an activation area 113 to indicate a position thereof.

As also depicted at least in FIG. 1, display 107 may be configured to render icons and/or data such as icons and/or data related to the time, connectivity, battery life, and the like, as well as icons which may be used to control other functionality at device 100.

Actuators 105-1, 105-2 will be interchangeably referred to hereafter, collectively, as actuators 105 and, generically as an actuator 105; sides 106-1, 106-2 will be interchangeably referred to hereafter, collectively, as sides 106 and, generically as a side 106; tactile indicators 111-1, 111-2 will be interchangeably referred to hereafter, collectively, as tactile indicators 111 and, generically as a tactile indicator 111; activation areas 113-1, 113-2 will be interchangeably referred to hereafter, collectively, as activation areas 113 and, generically as an activation area 113; and visual indicators 115-1, 115-2 will be interchangeably referred to hereafter, collectively, as visual indicators 115 and, generically as a visual indicator 115.

Indeed, each grouping of actuator 105, tactile indicator 111, activation area 113 and optional visual indicator 115 may be alternatively referred to as a data capture activation interface 129-1, 129-2 (collectively referred to as data capture activation interfaces 129 and, generically, as a data capture activation interface 129).

While as depicted, device 100 comprise two data capture activation interfaces 129, one on each side 106-1, 106-2, in other implementations, device 100 may comprise one data capture activation interface 129 on one of sides 106. In such implementations, device 100 comprises: housing 101; data capture component 103; an actuator 105 disposed on a side 106 of housing 101 and configured to activate data capture component 103 when actuated; a display 107, disposed within housing 101; a touch screen 109 disposed on display 107; a tactile indicator 111 at housing 101 between actuator 105 and touch screen 109; and, an activation area 113 of touch screen 109, adjacent tactile indicator 111, activation area 113 configured to initiate a digital location for activating data capture component 103 when touch input is received at activation area 113. In depicted implementations, touch screen 109 extends beyond display 107 to a side 106 of housing 101 adjacent an actuator 105, and the activation area 113 is located between a tactile indicator 111 and the display 107.

Furthermore, while as depicted data capture activation interfaces 129 are located at similar distances from a top and/or bottom of device 100, in other implementations each of data capture activation interfaces 129 may be staggered and/or located at different distances from a top and/or bottom of device 100. For example, when device 100 is configured for right-handed operation, data capture activation interface 129-1 may be positioned such that an index finger of a right hand (e.g. of a user) gripping device 100 may access data capture activation interface 129-1 (e.g. at least one of actuator 105-1 and activation area 113-1), and data capture activation interface 129-2 may be positioned such that a thumb of the right hand gripping device 100 may access data capture activation interface 129-2 (e.g. at least one of actuator 105-2 and activation area 113-2).

Similarly, when device 100 is configured for left-handed operation, data capture activation interface 129-1 may be positioned such that a thumb of a left hand gripping device 100 may access data capture activation interface 129-1 (e.g. at least one of actuator 105-1 and activation area 113-1), and data capture activation interface 129-2 may be positioned such that an index finger of the left hand gripping device 100 may access data capture activation interface 129-2 (e.g. at least one of actuator 105-2 and activation area 113-2).

Human factors and/or ergonomic studies may be used to determine locations of actuators 105 and/or activation areas 113, though such locations will not be ergonomically suitable for all users.

As further depicted in FIG. 1, device 100 may further comprise an optional speaker 132, an optional microphone 134, one or more optional volume keys 140 for controlling a level of sound at speaker 132, and an optional push-to-talk (PTT) actuator 142 for activating and/or controlling PTT functionality and/or a PTT device at device 100.

Figure 4:
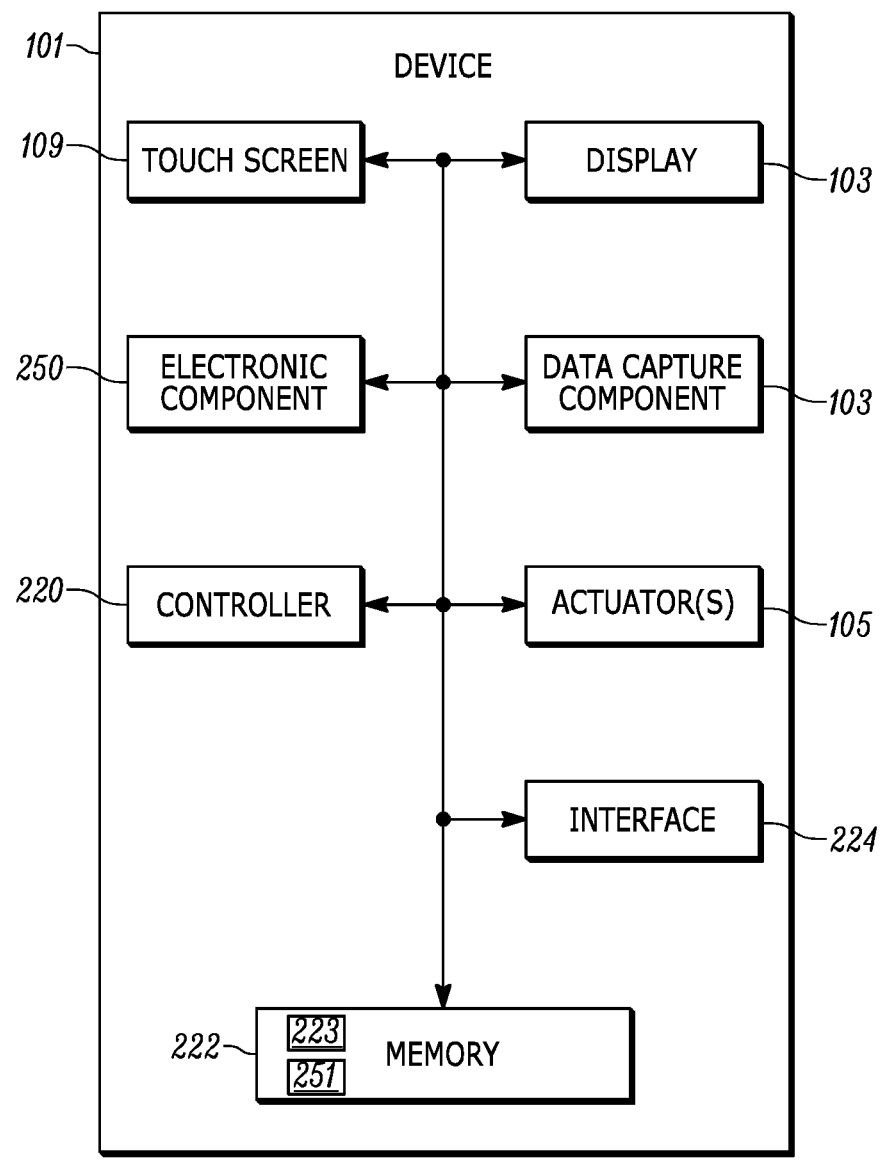
FIG. 4 depicts a schematic diagram of the mobile device of FIG. 1, according to non-limiting implementations.

With reference to FIG. 4, device 100 further comprises a controller 220, a memory 222, storing an application 223, a communication interface 224 (interchangeably referred to hereafter as interface 224) and an optional further electronic component 250, controller 220 interconnected with data capture component 103, actuator(s) 105, display 107, touch screen 109, memory 222, interface 224 and optional further electronic component 250. As depicted, memory 222 also stores a second application 251 as described below.

While not depicted in FIG. 4, it is assumed that controller 220 is further interconnected with speaker 132, microphone 134, volume keys 140 and PTT actuator 142, as well as any other electronic and/or communication components at device 100 including, but not limited to, a radio frequency identification (RFID) device and/or reader, a Near Field Communication (NFC) device and/or reader, and the like. For example, if data capture component 103 comprises a camera (used as an image capture device in scanning and/or warehousing operations) and/or a scanner, then electronic component 250 may comprise an RFID device and/or an NFC device, which may also be actuatable using one or more of data capture activation interfaces 129. Alternatively, further electronic component 250 may comprise one or more of a camera device (e.g. not used as a scanner and/or or for warehousing applications), a PTT device and/or radio, and a messaging device (e.g. one or more radios and/or graphic user interfaces used to receive, compose and/or send messages, including, but not limited to, email, texts, SMS (short message services) messages, and the like.

Data capture component 103 may comprises one or more of a scanner and/or data scanner and a camera including, but not limited to, imagers and/or laser-based scanner data acquisition components. A pointing direction and/or field of view of data capture component 103 may extend from a rear of device and/or a top edge of housing 101; for example, as indicated in FIG. 2, when data capture component 103 comprises a camera and/or a scanner, a lens of the camera and/or a field of view of the scanner may be located at a rear of device 100 (and/or alternatively at top edge of housing 101).

Device 100 generally comprises a mobile device which may include, but is not limited to, any suitable combination of electronic devices, communications devices, computing devices, portable electronic devices, mobile computing devices, portable computing devices, tablet computing devices, telephones, PDAs (personal digital assistants), cellphones, smartphones, e-readers, mobile camera devices and the like, each of which comprises a data capture component. Other suitable devices are within the scope of present implementations. For example, device 100 need not comprise a mobile communication device, but rather may comprise a device with specialized functions, for example a device having warehouse inventory tracking and/or other data acquisition functionality, such as a mobile scanner having one or more of a radio frequency identification (RFID) reader, Near Field Communication (NFC) reader, imager, and/or laser-based scanner data acquisition components. In some implementations, data capture component may comprise a camera used to capture images for warehousing functionality. In yet further implementations, device 100 may be mountable in a vehicle.

However, as depicted device 100 comprises a mobile device, configured for data and/or telephony functionality, and optionally for warehousing functionality. However, other devices are within the scope of present implementations.

In particular, device 100 is configured with edge activation, for example, to activate data capture component 103, as described in more detail below.

With reference to FIG. 4, controller 220 may comprise a processor and/or a plurality of processors, including but not limited to one or more central processors (CPUs) and/or one or more processing units; either way, controller 220 comprises a hardware element and/or a hardware processor. Indeed, in some implementations, controller 220 may comprise an ASIC (application-specific integrated circuit) and/or an FPGA (field-programmable gate array) specifically configured to implement at least data capture functionality of device 100. In other words, controller 220 may be configured to control data capture component 103 upon receipt of input from actuator 105 and configure activation area 113 to initiate a digital location for activating data capture component 103 when touch input is received at an activation area 113 (alternatively, controller 220 may be configured to configure actuator 105 to initiate a digital location for activating data capture component 103 when touch input is received at an activation area 113). Hence, device 100 is preferably not a generic computing device, but a device specifically configured to implement specific edge functionality. For example, device 100 and/or controller 220 may specifically comprise a computer executable engine configured to implement specific edge functionality.

Memory 222 may comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 100 as described herein are typically maintained, persistently, in memory 222 and used by controller 220 which makes appropriate utilization of volatile storage during the execution of such programming instructions. Those skilled in the art recognize that memory 222 is an example of computer readable media that may store programming instructions executable on controller 220. Furthermore, memory 222 is also an example of a memory unit and/or memory module and/or a non-volatile memory.

In particular, memory 222 may store application 223 that, when executed by controller 220, enables controller 220 to implement edge functionality. In particular, in some implementations, when controller 220 processes application 223, to enable controller 220 to configure an activation area 113 to: initiate a digital location for activating data capture component 103 when touch input is received at an activation area 113.

As depicted, memory 222 further stores application 251 that, when executed by controller 220, enables controller 220 to implement data capture functionality at device 100. In other words, as describe in detail below, application 223 may be executed by controller 220 to configure an activation area 113 to: initiate a digital location for activating data capture component 103 when touch input is received at an activation area 113; and, when the digital location (or actuator 105) is used to activate data capture component 103, controller 220 executing application 251 may be used to control data capture component 103 to capture data. Hence, for example, application 251 may comprise an application which may be used to control data capture component 103 to capture, and optionally store, data, such as images, barcodes and the like. As such, application 251 may comprise a warehousing application and application 223 may be further configured to launch application 251 when touch input is received at the digital location. While as depicted, applications 223, 251 are separate applications, in other implementations, applications 223, 251 may be combined in a single application (e.g. application 223 may be module of application 251).

As depicted, controller 220 also connects to interface 224, which may be implemented as one or more radios and/or connectors and/or network adaptors, configured to communicate wired and/or wirelessly with network architecture that is used to implement one or more communication links between other devices and/or a network, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, WLAN (wireless local area network) links, WiFi links, WiMax links, packet based links, the Internet, analog networks, the PSTN (public switched telephone network), access points, and the like, and/or a combination. However, interface 224 may be optional and device need not be configured to communicate with networks, though device 100 may be generally configured to convey data to other devices, for example using wired and/or wireless connections, and the like, with the other devices.

Controller 220 be further configured to communicate with other and/or optional input devices (not depicted) of device 100, which, when present, may be configured to receive input data including, but not limited to, any suitable combination of a keyboard, a keypad, a pointing device, a mouse, a track wheel, a trackball, a touchpad and the like. Other suitable input devices are within the scope of present implementations. Indeed, touch screen 109 may generally be used as an input device to control other functionality at device 100, for example, using graphic user interfaces, pull down menus, and the like.

While not depicted, device 100 further comprises a power supply, including, but not limited to, a connection to a mains power supply and/or a power adaptor (e.g. an AC-to-DC (alternating current to direct current) adaptor), and alternatively a battery, a power pack and the like. In general such a power supply powers components of device 100.

Hence, it should be understood that in general a wide variety of configurations for device 100 are contemplated and device 100 may include other components related, for example to telephony, messaging, entertainment, and/or any other components that may be used with a mobile device.

Regardless, controller 220 may be further configured to communicate with display 107 and touch screen 109. Display comprises any suitable one of, or combination of, flat panel displays (e.g. LCD (liquid crystal display), plasma displays, OLED (organic light emitting diode) displays), CRTs (cathode ray tubes) and the like, as well as capacitive or resistive touchscreens. In other words, display 107 and touch screen 109 may be integrated with each other, such that display 107 and touch screen 109 together form touch screen display. Similarly, touch screen 109 may comprise a capacitive touch screen or resistive touch screen, which may be integrated with display 107.

Figure 5:
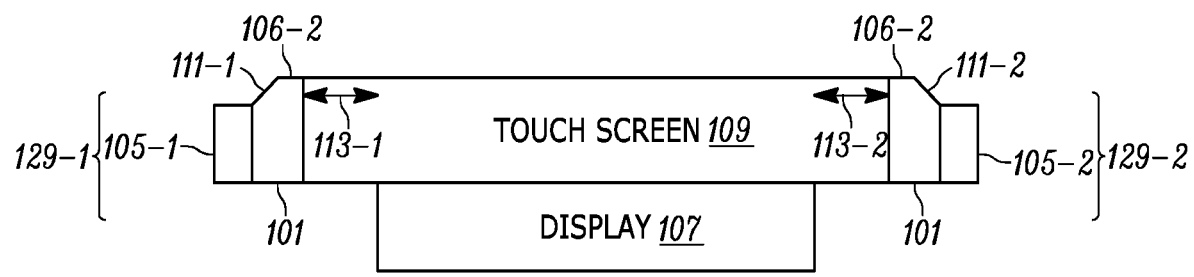
FIG. 5 depicts a schematic diagram of relative locations of certain components of the mobile device of FIG. 1, according to non-limiting implementations.

For example, attention is next directed to FIG. 5 which schematically depicts a side view of relative positions locations of actuators 105, sides 106 of housing 101, display 107, touch screen 109, and tactile indicators 111. In these implementations, touch screen 109 is located on display 107 and extends laterally from display 107 such that an area of touch screen 109 where touch input may be received (e.g. at front surface of touch screen 109) is larger than an area of display 107. Hence, touch screen 109 may extend into a bezel of device 100 that at least partially surrounds display 107, though touch screen 109 need not extend into all regions of such a bezel. For example, touch screen 109 may extend only laterally from display 107 such that touch screen 109 extends beyond display 107 to sides 106 of housing 101 adjacent actuators 105. However, in such implementations, touch screen 109 need not extend from display 107 in a direction from a top of device 100 to a bottom of device 100 (or vice versa).

Regardless, areas of touch screen 109 that are located outside an area of display 107 may be referred to as a touch bezel and/or an active bezel; in other words, while touch input may generally be received at touch screen 109 to indicate selection of corresponding regions of display 107, touch input may also be received at touch screen 109 outside of the area of display 107, which effectively causes a bezel that at least partially surrounds display 107 to sense touch input. For example, as depicted, activation areas 113 of touch screen 109 are located between sides of display 107 and tactile indicators 111.

However, in other implementations, display 107 may also extend to sides 106, at least in the regions of activation areas 113 and display 107 may be controlled to render visual indicators of activation areas 113 in the same respective locations of activation areas 113.

Figure 6:
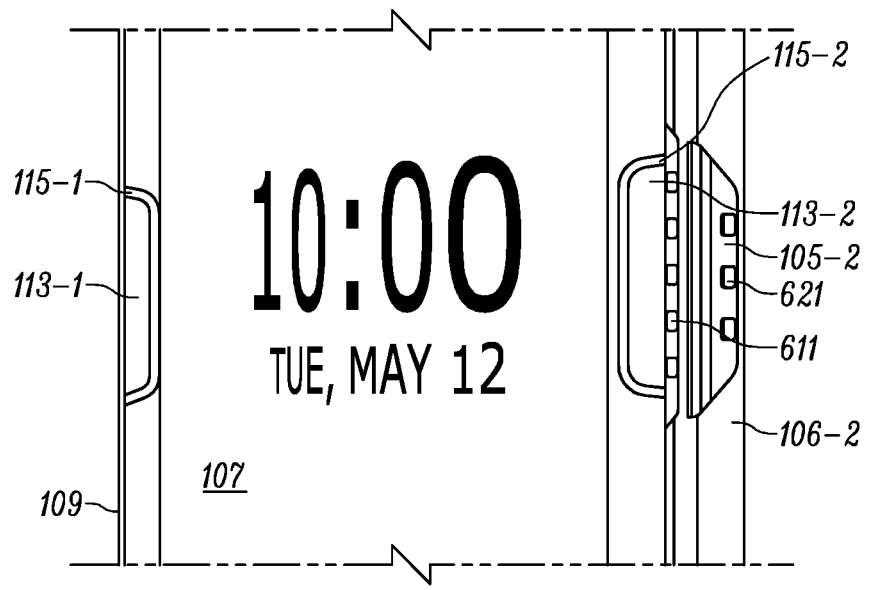
FIG. 6 depicts detail of an edge of the mobile device of FIG. 1, according to non-limiting implementations.

Attention is next directed to FIG. 6 which depicts detail of data capture activation interface 129-2; however, data capture interface 129-1 may be similar to data capture activation interface 129-2 depicted in FIG. 6. As clearly depicted in FIG. 6, tactile indicator 111-2 comprises a notch at housing 101 adjacent actuator 105-2, and in particular between actuator 105-2 and activation area 113-2. As depicted, the notch extends slightly past each of actuator 105-2 and activation area 113-2, though the notch may be of a slightly smaller length than each of actuator 105-2 and activation area 113-2, or about same length as each of actuator 105-2 and activation area 113-2.

Furthermore, the notch is located in a corner formed by side 106-2 and a front of housing 101.

Alternatively, tactile indicator 111-2 may comprise one or more bumps 611 at housing 101 adjacent actuator 105-2 (bumps 611 depicted in outline to indicate that they may be optional when a notch is present); indeed, as depicted, tactile indicator 111-2 comprise both a notch and bumps 611 located at the notch. In other implementations, only bumps 611 may be present, and not a notch. In yet further implementations, other tactile indicators may be used with, or without, the notch and/or bumps, for example, a ridge and the like. Regardless, each tactile indicator 111 may be positioned between a respective actuator 105 and a respective activation area 113 such that when a user places a finger on an actuator 105, a respective tactile indicator 111 may be used to easily locate a respective activation area 113 without having to view device 100.

To further assist with tactile locating of actuators 105, in some implementations, actuator 105-2 (and/or actuator 105-1) may also comprise bumps 621, as depicted.

As also depicted in FIG. 6, activation area 113-2 comprises a portion of touch screen 109 adjacent actuator 105-2 and/or tactile indicator 111-2, with activation area 113-2 extending a similar distance along touch screen 109 as a length of actuator 105-2, and outside of an area of display 107, though a length of activation area 113-2 may be longer or shorter than actuator 105-2 as long as activation area 113-2 is tactilely locatable by a finger and/or thumb touching actuator 105-2 using tactile indicator 111-2, such that touch input may be received at activation area 113-2 to initiate a digital location for activating data capture component 103. Hence, each of actuator 105-2 and activation area 113-2 may be of different lengths: as depicted a longest dimension of activation area 113-2 is of a smaller length than a longest dimension of actuator 105-2, each being trapezoidal in shape, though other shapes of each are within the scope of present implementations.

Indeed, activation area 113-2 hence comprises a touch sensor and/or capacitive sensor and/or resistive sensor, depending on a technology of touch screen 109.

However, in other implementations, device 100 may not comprise a touch screen over the entirely of display 107, and only activation areas 113 are configured to receive touch input to initiate a digital location for activating data capture component 103. In other words, touch sensors may be located at activation areas 113, and otherwise display 107 is not equipped with a touch screen.

Figure 7:
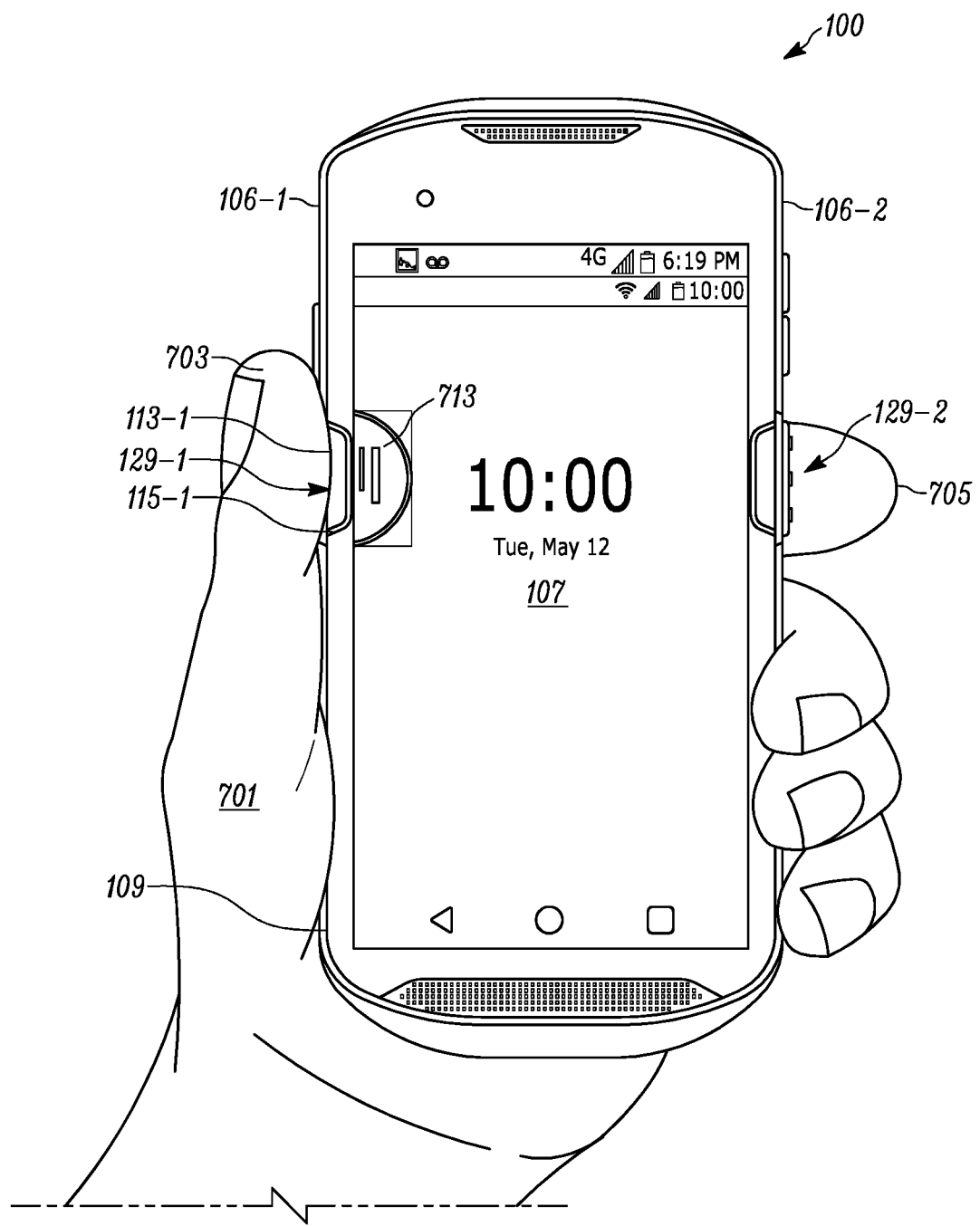
FIG. 7 depicts the mobile device of FIG. 1 in operation, according to non-limiting implementations.
Figure 8:
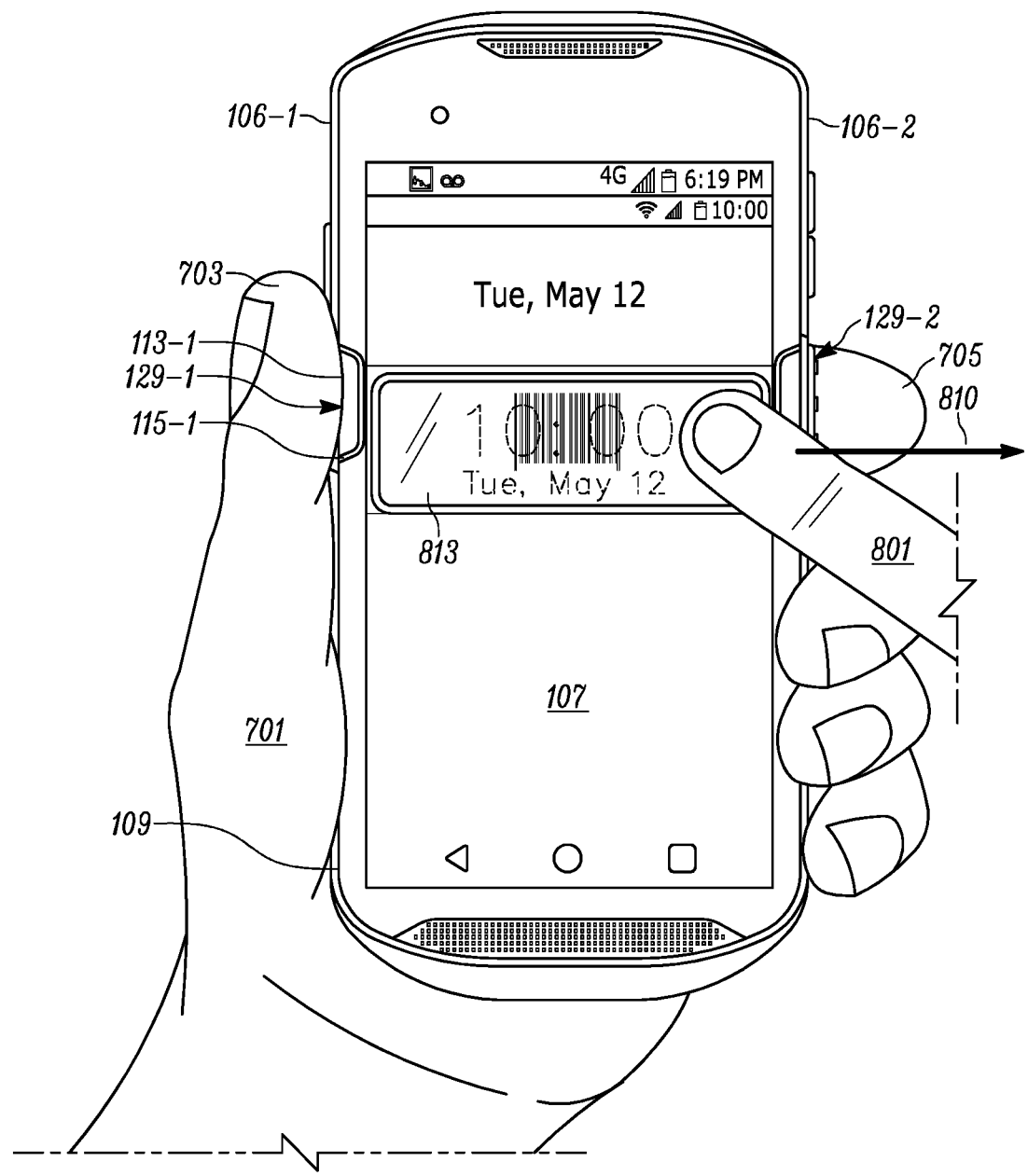
FIG. 8 depicts the mobile device of FIG. 1 in operation in a sequence following the operation depicted in FIG. 7, according to non-limiting implementations.
Figure 9:
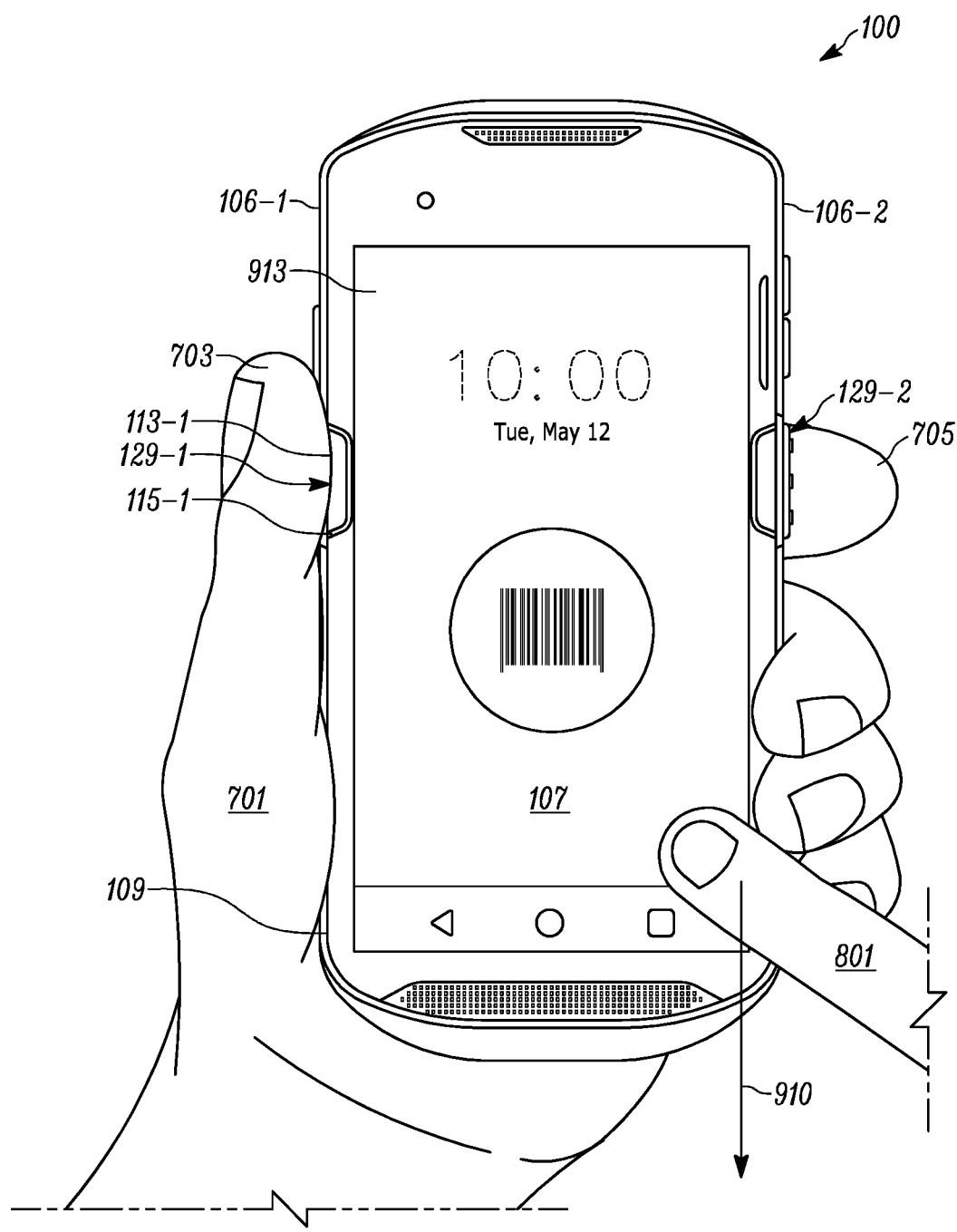
FIG. 9 depicts the mobile device of FIG. 1 in operation in a sequence following the operation depicted in FIG. 8, according to non-limiting implementations.

Operation of device 100 will now be described with respect to FIG. 7, FIG. 8 and FIG. 9. In particular, each of FIG. 7, FIG. 8 and FIG. 9 depict device 100 being gripped by a left hand 701 of a user such that a thumb 703 of hand 701 is located at data capture activation interface 129-1, and an index finger 705 of hand 701 is located at data capture activation interface 129-2. While not all components of device 100 are indicated in each of FIG. 7, FIG. 8 and FIG. 9, they are appreciated to be nonetheless present.

In particular, in FIG. 7, thumb 703 has tactilely located activation area 113-1 using tactile indicator 111-1 (which, while not depicted in FIG. 7, is appreciated to be nonetheless present, though obscured by thumb 703). For example thumb 703 has been placed on actuator 105-1 (also not depicted and obscured by thumb 703) which feels tactile indicator 111-1 and uses tactile indicator 111-1 for guidance to activation area 113-1. Hence, thumb 703 touches activation area 113-1, such that touch input is received at activation area 113-1. Alternatively, activation area 113-1 may be located visually using visual indicator 115-1.

In some implementations, such touch input causes activation area 113-1 to be configured as a digital location for activating data capture component 103 (e.g. a digital location for activating data capture component 103 may comprises an activation area 113 of touch screen 109, such that data capture component 103 is activated when touch input is received at an activation area 113, for example, using application 251). In other words, in these implementations, thumb touching activation area 113-1 may cause data capture component 103 to activate (and/or controller 220 to execute application 251), for example to capture an image, perform a data scan, and the like.

However, in depicted implementations, touch input received at activation area 113-1 initiates a digital location for activating the data capture component 103 at display 107. As depicted, the digital location for activating the data capture component 103 comprising a digital button 713 rendered at display 107 adjacent activation area 113-1, digital button 713 indicating a corresponding area of touch screen 109 configured to receive further touch input for activating data capture component 103. In other words, a user may use a finger and/or thumb of left hand 701 and/or a right hand (not depicted) and/or another body part to touch and/or tap an area of touch screen 109 corresponding to digital button 713, which causes data capture component 103 to activate (and/or controller 220 to execute application 251). Digital button 713 may alternatively be referred to as a data capture activation area rendered at display 107

In some implementations, digital button 713 may be configured to be one or more of moved and extended on display 107, along with the corresponding area of the touch screen 109, when given input is received at touch screen 109. For example, attention is directed to FIG. 8 which depicts device 100 after a finger 801 (e.g. of a left hand and/or a hand other than hand 701) has interacted with digital button 813, and specifically finger 801 has touched an edge of digital button 713 opposite activation area 113-1 (and/or adjacent side 106-1) to slide the edge of digital button 713 to an opposite side (e.g. towards side 106-2) of device 100 (e.g. in a slide gesture as indicated by arrow 810). Such a gesture causes digital button 713 to expand into an expanded digital button 813 (and/or an expanded data capture activation area), thereby increasing a corresponding area of touch screen 109 at which touch input may be received in order to activate data capture component 103. Such an arrangement which may be more ergonomically convenient for a user and regardless provides more flexibility for receiving touch input to activate data capture component 103.

Expanded digital button 813 may be decreased back into digital button 713 by receiving further input (e e.g. finger 801 sliding in a direction opposite to arrow 810); hence, digital button 713 may alternatively be referred to as a minimized digital button (and/or a minimized data capture activation area).

Alternatively, further given input may be received at touch screen 109 to move digital button 713 and/or expanded digital button 813 on display 107, for example a location on display 107 that is more ergonomically for an interaction with a user.

In yet further implementations, expanded digital button 813 may be expanded further and/or maximized. For example, attention is directed to FIG. 9 which depicts device 100 after finger has interacted with digital button 813, and specifically finger 801 has touched one or more edges of expanded digital button 813 (e.g. a top edge and/or a bottom edge) to slide the one or more edges of digital button 813 to towards a bottom and/or a top of device 100 (e.g. in a slide gesture as indicated by arrow 910). Such a gesture causes expanded digital button 813 to further expand into a maximized digital button 913 (and/or a maximized data capture activation area) that extends across all of display 107, thereby increasing a corresponding area of touch screen 109 at which touch input may be received in order to activate data capture component 103, which may be more ergonomically convenient for a user and regardless provides more flexibility for receiving touch input to activate data capture component 103.

Maximized digital button 913 may be decreased back into expanded digital button 813 by receiving further input (e.g. finger 801 sliding in a direction opposite to arrow 901).

Hence, digital button 713 is generally configured to be one or more of moved and extended on display 107, along with the corresponding area of touch screen 109, when given input is received at touch screen 109.

Alternatively, digital buttons 713, 813, 913 being moved and/or expanded and/or decreased in size may be indicated using any sliding gesture and/or tap sequence; for example, controller 220 may be configured to receive a given touch input, including, but not limited to a given sliding gesture and/or a given tap sequence at touch screen 109, and control digital buttons 713, 813, 913 accordingly.

Furthermore, one or more of digital buttons 713, 813, 913, may be at least partially transparent such that icons and/or other rendered items at the display are at least partially visible through the digital button (and/or data capture activation area), for example as best.

Furthermore, one or more of digital buttons 713, 813, 913 may include icons and the like indicating a functionality thereof; for example, as depicted each of digital buttons 713, 813, 913 include a barcode icon indicating that digital buttons 713, 813, 913 may be used for warehouse scanning functionality (e.g. using data capture component 103).

One of ordinary skill in the art appreciates that various modifications and changes may be made without departing from the scope of the specification.

Figure 10:
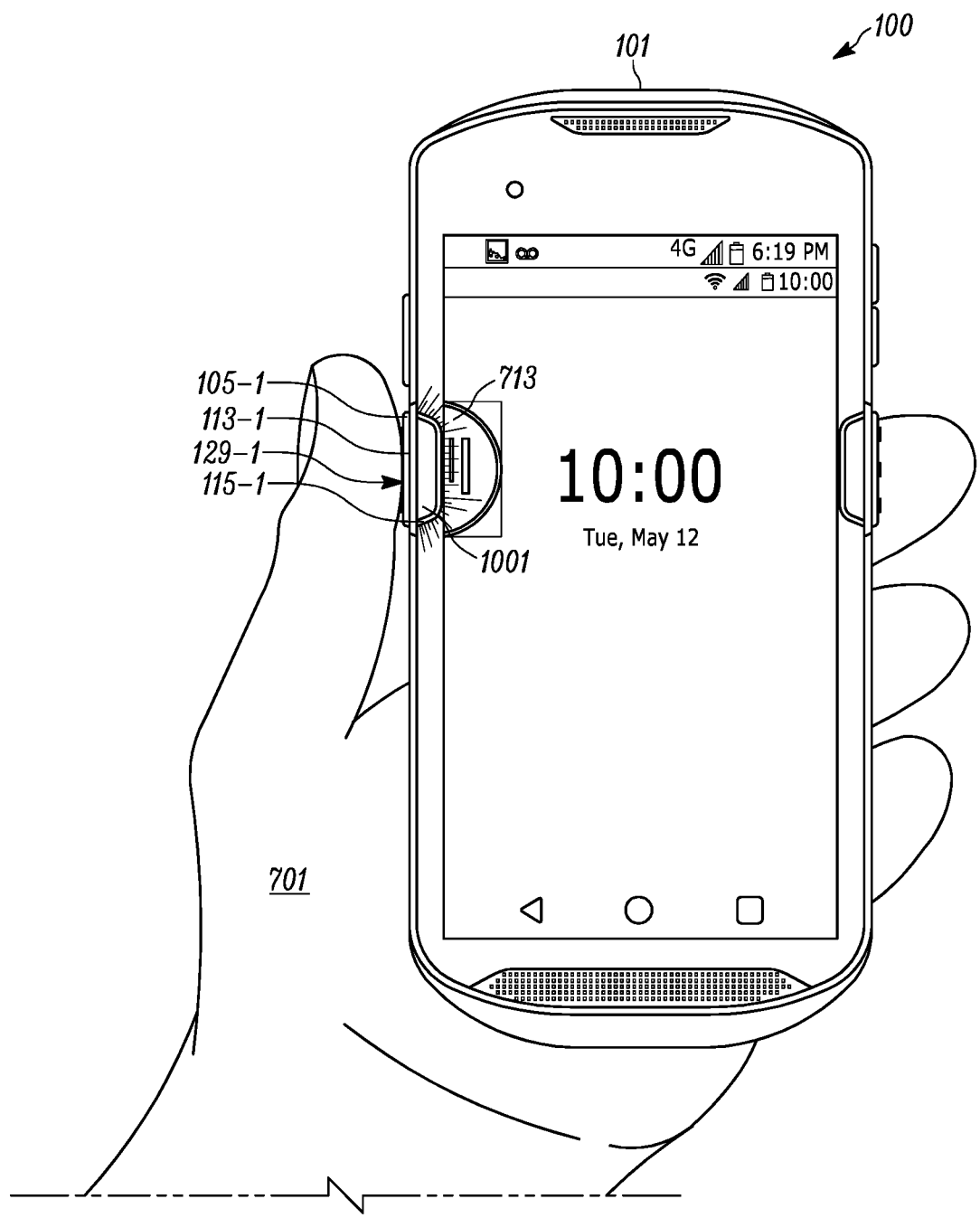
FIG. 10 depicts the mobile device of FIG. 1 in operation with a light to show an activation area of a touch screen, according to non-limiting implementations.

For example, attention is directed to FIG. 10 which depicts device 100 again being held by hand 701. While not all components of device 100 are indicated in FIG. 10 they are appreciated to be nonetheless present. In particular, in FIG. 10, it is assumed that data capture component 103 is being activated, for example, using actuator 105-1 and/or activation area 113-1 and/or digital button 713, and the like. However, in these implementations, device 100 further comprises a light 1001 configured to illuminate activation area 113-1 when one or more of: touch input is received at the activation area 113-1; and respective touch input is received at actuator 105-1. For example, light 1001 may comprise a light emitting diode (LED) disposed in a bezel and/or a housing 101 of device 100 and/or behind activation are 113-1, and in communication with controller 220, which controls light 1001 to illuminate when one or more of: touch input is received at the activation area 113-1; and respective touch input is received at actuator 105-1.

In implementations where display 107 extends under activation areas 113, display 107 may be controlled in the region of activation areas 113 to provide light 1001.

In yet further implementations, a function associated with a data capture activation interface 129 (e.g. an actuator 105 and an associated activation area 113) may be configured, for example, to activate further electronic component 250 rather than data capture component 103. In these implementations, such a change in function of a data capture activation interface 129 may occur upon receipt of given touch input at an activation area 113, such as a given tap sequence. For example, receipt of a single tap may cause the associated data capture activation interface 129 to continue to control data capture component 103. However, receipt of two taps may cause the associated data capture activation interface 129 to control a camera (e.g. in a camera mode rather than a scanning mode). Similarly, receipt of three taps may cause the associated data capture activation interface 129 to control a PTT device, receipt of four taps may cause the associated data capture activation interface 129 to control an RFID device, and receipt of five taps may cause the associated data capture activation interface 129 to control an NFC device, etc. However, other types of given input are within the scope of present implementations, and the number of devices controllable by a data capture activation interface 129 may be indicated in application 223. For example, given input may cause a data capture activation interface 129 to initiate a telephone interface. Examples of a PTT interface and a telephone interface are respectively described below with respect to FIG. 14 and FIG. 15.

Regardless, in these implementations, an activation area 113 may be configured to receive given touch input configured to change a mode of both an associated actuator 105 and a digital location from actuating data capture component 103 to actuating a further electronic component 250 when given touch input is received at activation area 113. For example, in these implementations, device 100 may function as described above with respect to FIG. 7, FIG. 8 and FIG. 9, however digital buttons 713, 813, 913 (and/or an actuator 105 and/or an activation area 113) may be used to control further electronic component 250.

Furthermore, in these implementations, light 1001 may be configured to illuminate activation area 113, according to the given touch input, to indicate the mode. For example, light 1001 may be configured to one or more of change color and change a lighting pattern according to the given touch input, to indicate the mode. For example, light 1001 may comprise a light emitting diode (LED) configured to change color and/or flash in a given manner and/or in a given pattern depending on which component of device 100 is being controlled by the associated actuator 105 and/or the associated activation area 113.

Figure 11:
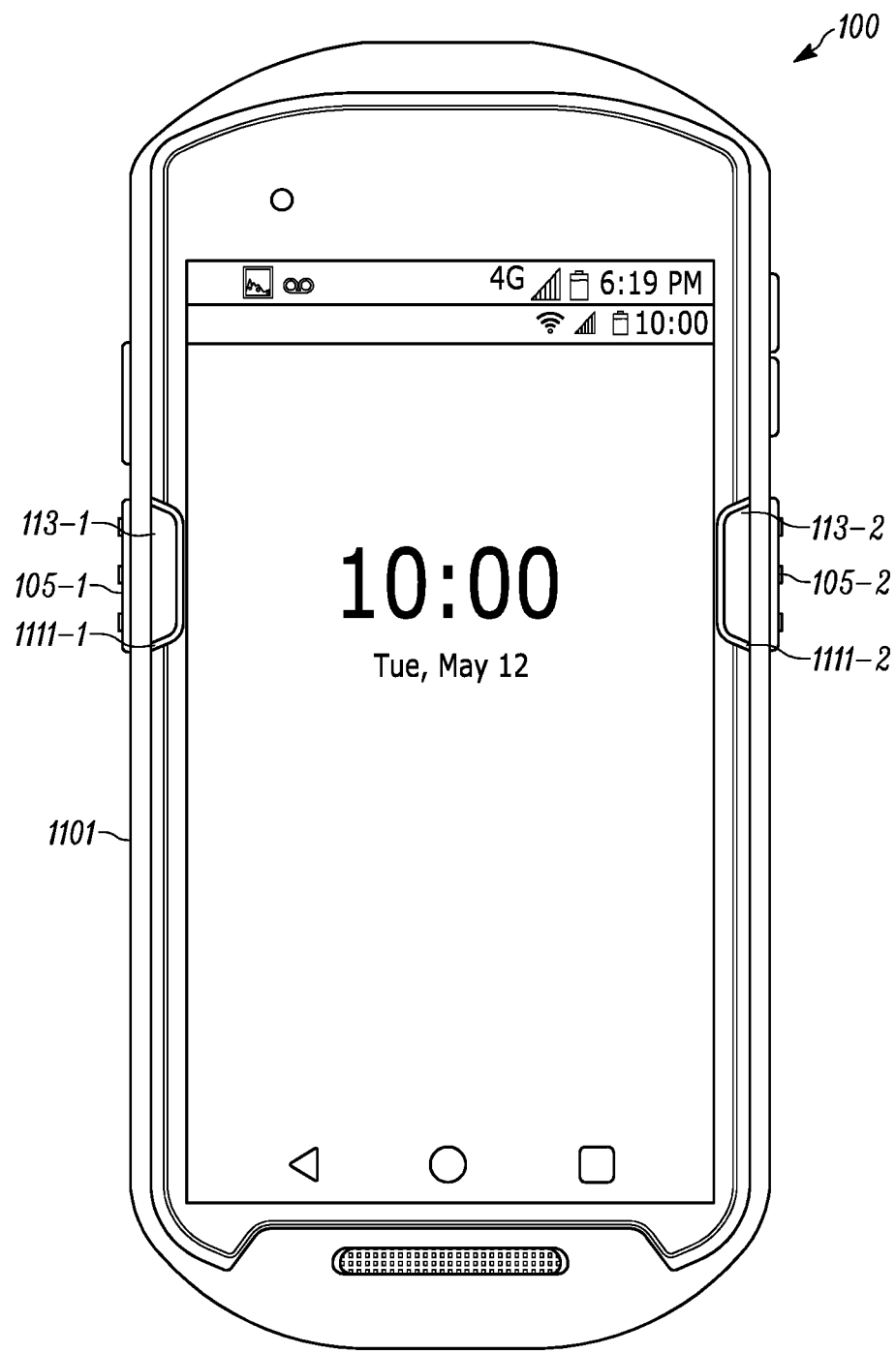
FIG. 11 depicts an alternative implementation of the mobile device of FIG. 1 that includes an exoskeleton, according to non-limiting implementations.

One of ordinary skill in the art appreciates that various modifications and changes may be made. For example, attention is directed to FIG. 11 which depicts device 100 adapted for use with an exoskeleton 1101. Exoskeleton 1101 may wrap around sides of device 100 to provide mechanical and/or physical protection to device 100 and/or to adapt device 100 for use with holders and the like which may mate with exoskeleton 1101 and/or which form a portion of exoskeleton 1101. Exoskeleton 1101 includes apertures through which actuators, buttons, keys and the like located at sides of device 100 are accessible, including actuators 105. While exoskeleton 1101 may also hide tactile indicators 111, exoskeleton 1101 may include respective tactile indicators 1111-1, 1111-2 in a same relative location as tactile indicators 111 and which perform a similar function as tactile indicators 111, enabling active areas 113 to be tactilely located using actuators 105 as a starting point.

Figure 12:
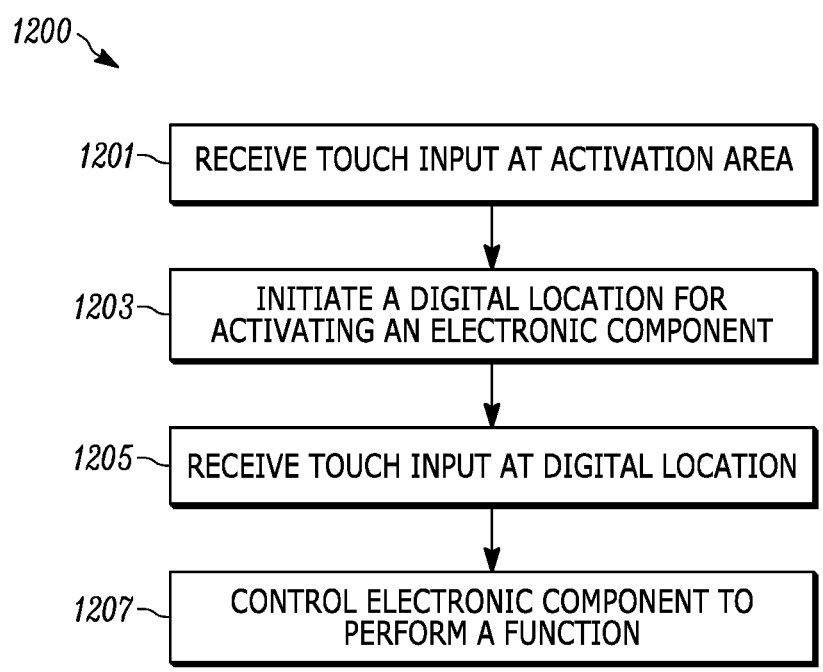
FIG. 12 depicts a block diagram of a flowchart of a method for edge activation, according to non-limiting implementations.

Attention is now directed to FIG. 12 which depicts a block diagram of a flowchart of a method 1200 for providing edge activation. In order to assist in the explanation of method 1200, it will be assumed that method 1200 is performed using device 100, and specifically by controller 220 at device 100, when controller 220 processes instructions stored at memory 222, for example application 223 and/or application 251. Indeed, method 1200 is one way in which device 100 may be configured. Furthermore, the following discussion of method 1200 will lead to a further understanding of device 100, and its various components. However, it is to be understood that device 100 and/or method 1200 may be varied, and need not work exactly as discussed herein in conjunction with each other, and that such variations are within the scope of present implementations.

Regardless, it is to be emphasized, that method 1200 need not be performed in the exact sequence as shown, unless otherwise indicated; and likewise various blocks may be performed in parallel rather than in sequence; hence the elements of method 1200 are referred to herein as "blocks" rather than "steps". It is also to be understood, however, that method 1200 may be implemented on variations of device 100 as well.

At block 1201, controller 220 receives touch input using an activation area 113.

At block 1203, in response to the touch input being received at the activation area 113 in block 1201, controller 220 initiates a digital location for activating an electronic component. The digital location comprises the activation area 113 where the touch was received at block 1201, and/or digital buttons, such as digital buttons 713, 813, 913. The electronic component may comprise data capture component 103 and/or electronic component 250.

At block 1205, controller 220 receives touch input at the digital location initiated in block 1203.

At block 1207, in response to the touch input being received at the digital location initiated in block 1205, controller 220 controls the electronic component to perform a function including, but not limited to, controlling data capture component 103 to capture data.

Indeed, it is appreciated that while heretofore specific implementations have been described where activation areas 113 may be used to initiate a digital location for controlling data capture component 103, method 1200 may be more generically implemented to use activation areas to initiate a digital location for controlling any suitable electronic component of device 100. In some implementations, configuration of an electronic component to be initially controlled using a digital location initiate using method 1200 may be configured at device 100 using graphic user interfaces, pull down menus, and the like.

Figure 13:
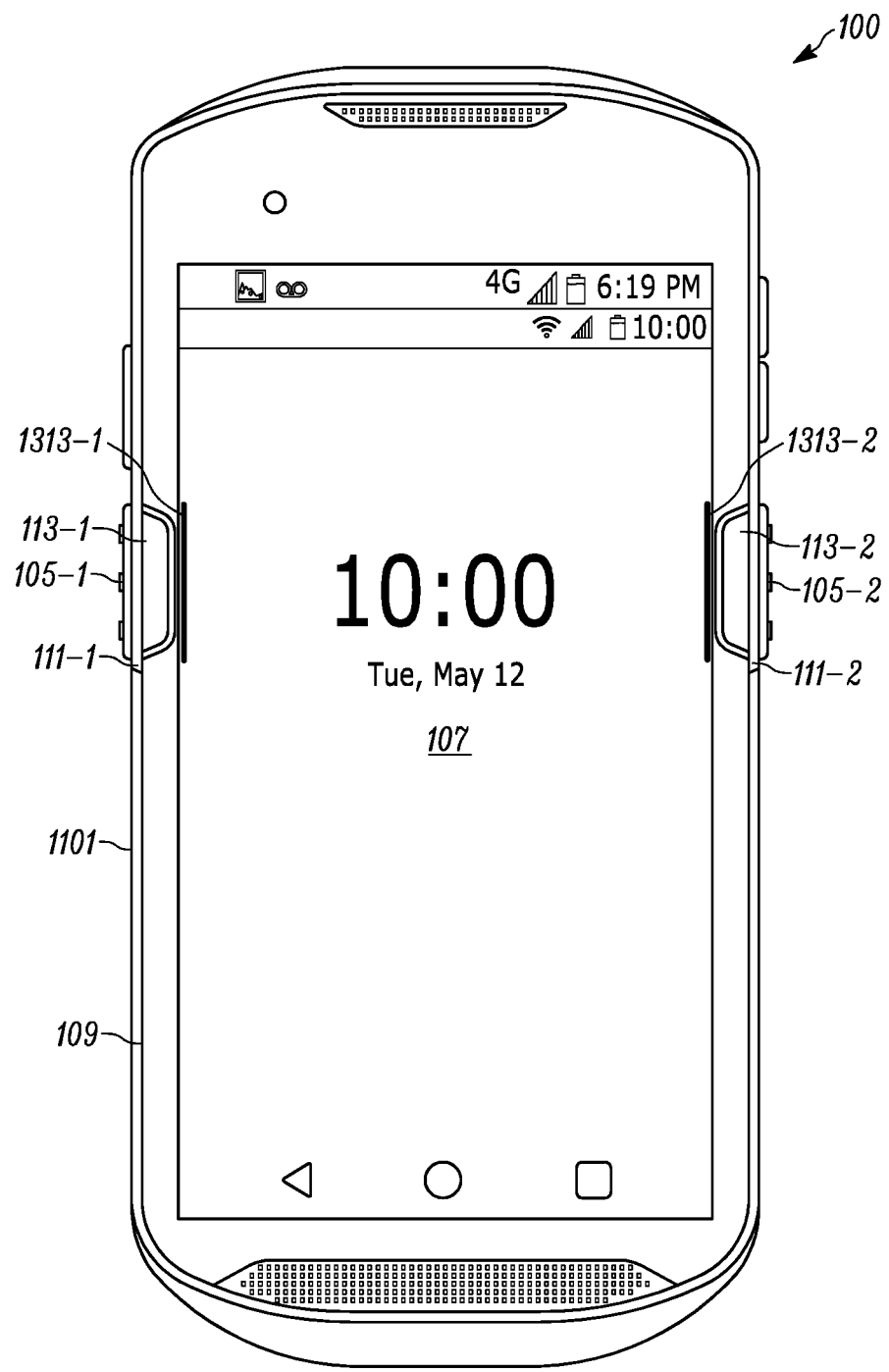
FIG. 13 depicts an alternative implementation of the mobile device of FIG. 1 that includes an activation area extending into a region of the display, according to non-limiting implementations.

One of ordinary skill in the art appreciates that various modifications and changes may be made. For example, attention is directed to FIG. 13 which depicts device 100 adapted to extend activation areas 113 into display 107. For example, as depicted, each respective activation area 113-1, 113-2 respectively extends into a respective area 1313-1, 1313-2 of display 107. Each respective area 1313-1, 1313-2 comprises an area of touch screen 109 that is over display 107; furthermore, each respective area 1313-1, 1313-2 can be a few pixels wide, and corresponding regions of display 107 can alternatively be controlled to visual indicator (e.g. corresponding regions of display 107 for each respective area 1313-1, 1313-2 can be a different color than adjacent regions of display 107).

Figure 14:
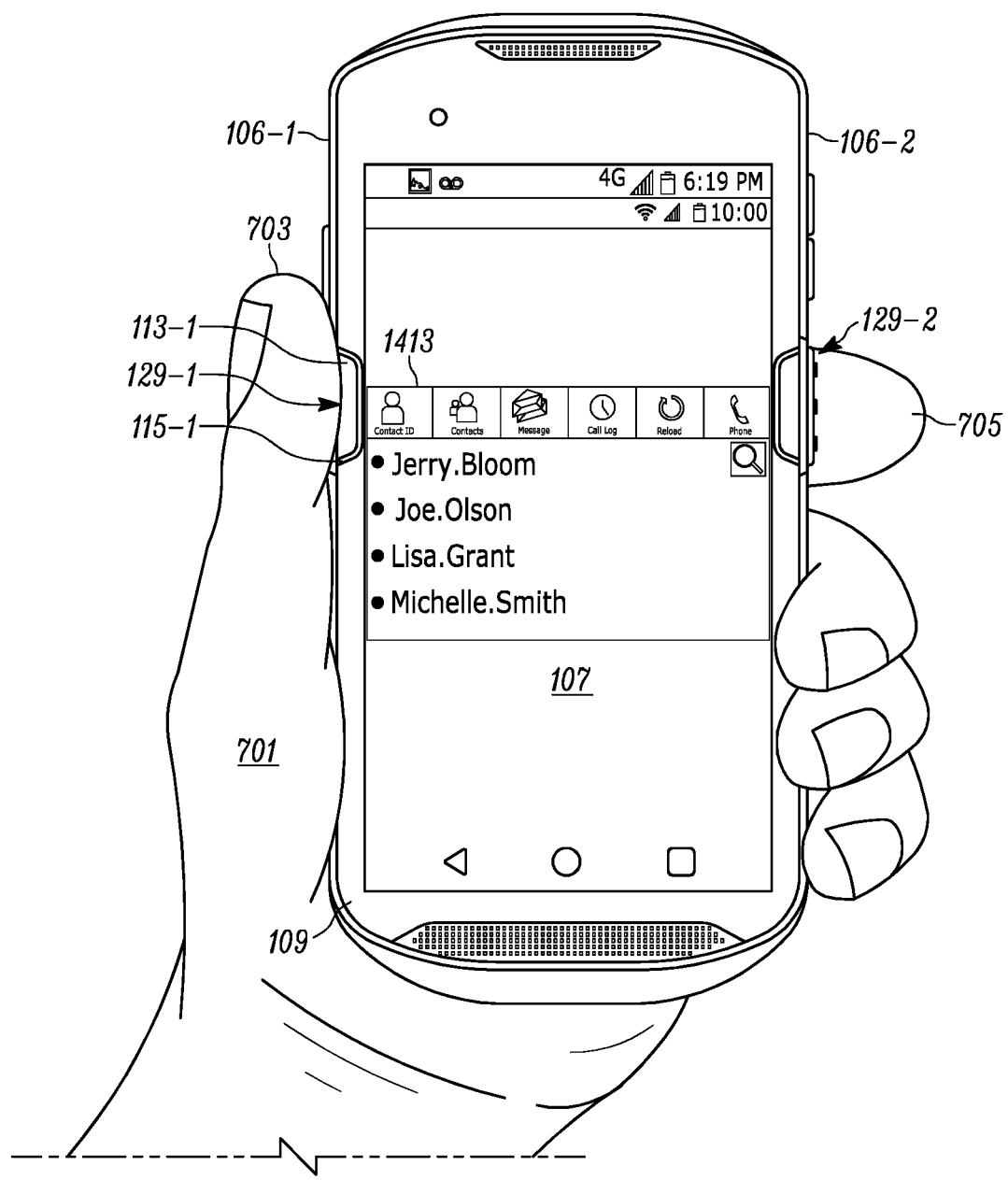
FIG. 14 depicts an alternative implementation of the mobile device of FIG. 1 that includes a push-to-talk interface, according to non-limiting implementations.

Attention is next directed to FIG. 14 which depicts device 100 after given input has been received (e.g. at activation area 113-1) to initiate a digital location 1413 at display 107 for activating a PTT device and/or activating PTT functionality at device 100. For example, as described above, a given number of taps (and the like) can be received at activation area 113-1 to initiate digital location 1513 for activating a PTT device. As such, digital location 1413 comprises a PTT interface for activating and/or controlling a PTT device and/or PTT functionality at device 100 including, but not limited to, digital buttons for viewing and/or selecting contacts (as depicted), initiating a PTT call, redialing, and the like, however other digital buttons, and the like, associated with PTT functionality are within the scope of present implementations. Furthermore, a position of at least a portion of digital location 1413 at display 107 may be configurable at device 100 and/or display 107.

Figure 15:
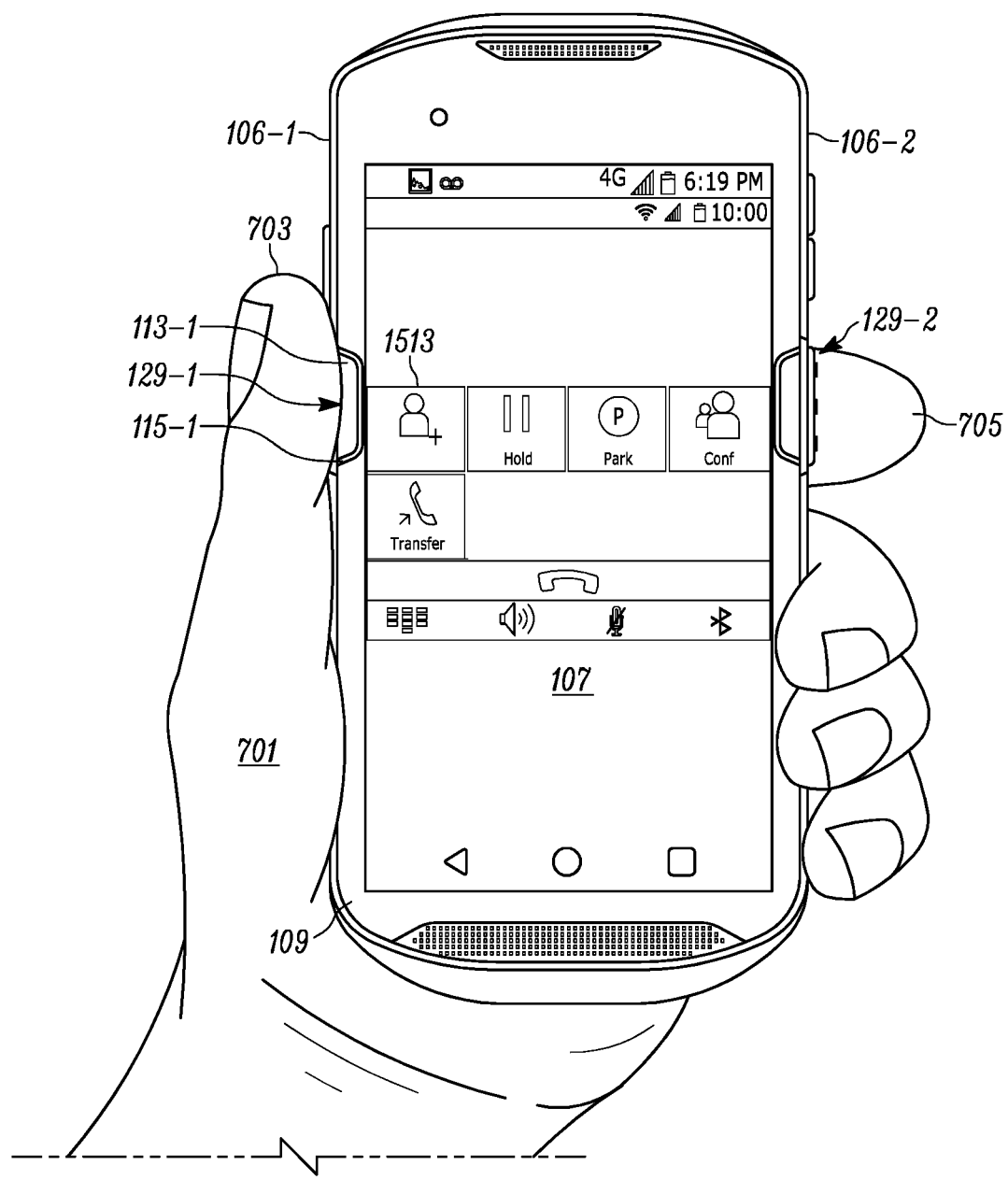
FIG. 15 depicts an alternative implementation of the mobile device of FIG. 1 that includes a a telephone interface, according to non-limiting implementations Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present specification.

Similarly, is next directed to FIG. 15 which depicts device 100 after given input has been received (e.g. at activation area 113-1) to initiate a digital location 1513 at display 107 for activating a telephone device and/or activating telephone functionality at device 100. For example, as described above, a given number of taps (and the like) can be received at activation area 113-1 to initiate digital location 1513 for activating a telephone device. As such, digital location 1513 comprises a telephone interface for activating and/or controlling a telephone device and/or telephone functionality at device 100 including, but not limited to, digital buttons for viewing and/or selecting contacts, initiating a telephone call, placing a call on hold, transferring a call, and the like, however other digital buttons, and the like, associated with telephone functionality are within the scope of present implementations. Furthermore, a position of at least a portion of digital location 1513 at display 107 may be configurable at device 100 and/or display 107.

Indeed, once any of the digital locations of digital buttons, user interfaces, and the like, described herein are configured at respective positions at display 107, controller 220 may save those positions in memory 222, and a next time that an activation area 113 is used to initiate the digital locations of the digital buttons, user interfaces, and the like, the digital buttons, user interfaces are rendered at the previous digital locations stored in memory 222.

Hence, disclosed herein is a device which provides ergonomic flexibility for controlling electronic components at a device, including a data capture component, which may reduce stress in a hand performing repetitive scanning actions and/or repetitive data capture actions at the device.

In the foregoing specification, specific implementations have been described. However, one of ordinary skill in the art appreciates that various modifications and changes may be made without departing from the scope of the specification as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an implementation may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

We claim:

1. A mobile device comprising:
a housing; a data capture component;
an actuator disposed on a side of the housing and configured to activate the data capture component when actuated;
a display, disposed within the housing;
a touch screen disposed on the display;
a tactile indicator at the housing between the actuator and the touch screen; and,
an activation area of the touch screen, adjacent the tactile indicator, the activation area configured to initiate a digital location for activating the data capture component when touch input is received at the activation area, wherein the digital location for activating the data capture component comprises a digital button rendered at the display adjacent the activation area of the touch screen, the digital button indicating a corresponding area of the touch screen configured to receive further touch input for activating the data capture component.

2. The mobile device of claim 1, further comprising a visual indicator at the touch screen, the visual indicator indicating a location of the activation area and the actuator.

3. The mobile device of claim 1, wherein the display is configured to render a visual indicator of a location of the activation area and the actuator.

4. The mobile device of claim 1, further comprising a light configured to illuminate the activation area when one or more of: the touch input is received at the activation area; and respective touch input is received at the actuator.

5. The mobile device of claim 1, wherein the tactile indicator comprises a notch at the housing adjacent the actuator.

6. The mobile device of claim 1, wherein the tactile indicator comprises one or more bumps at the housing adjacent the actuator.

7. The mobile device of claim 1, wherein the data capture component comprises one or more of a data scanner and a camera.

8. The mobile device of claim 1, wherein the touch screen extends beyond the display to the side of the housing adjacent the actuator, the activation area located between the tactile indicator and the display.

9. The mobile device of claim 1, wherein the digital button is configured to be one or more of moved and extended on the display, along with the corresponding area of the touch screen.

10. The mobile device of claim 1, further comprising a further electronic component, the activation area configured to change a mode of both the actuator and the digital location from actuating the data capture component to actuating the further electronic component.

11. The mobile device of claim 10, further comprising a light configured to illuminate the activation area to indicate the mode.

12. The mobile device of claim 11, wherein the light is configured to one or more of change color and change a lighting pattern to indicate the mode.

13. The mobile device of claim 10, wherein the further electronic component comprises one or more of a camera device, telephone device, a push-to-talk device, and a messaging device.

14. The mobile device of claim 1, further comprising a second actuator disposed on a second side of the housing, a second tactile indicator at the housing between the second actuator and the touch screen; and, a second activation area of the touch screen, each of the second actuator, the second tactile indicator and the second activation area respectively similar to the actuator, the tactile indicator and the activation area.

* * * * *